June 10, 1958

J. H. HAINES 2,838,598

TELEVISION SYSTEM

Filed May 1, 1956

3 Sheets-Sheet 1

INVENTOR.
JESSE HILTON HAINES
BY
Darby + Darby
ATTORNEYS

June 10, 1958 J. H. HAINES 2,838,598

TELEVISION SYSTEM

Filed May 1, 1956 3 Sheets-Sheet 2

INVENTOR.
JESSE HILTON HAINES
BY
Darby & Darby
ATTORNEYS

June 10, 1958 J. H. HAINES 2,838,598

TELEVISION SYSTEM

Filed May 1, 1956 3 Sheets-Sheet 3

INVENTOR.
JESSE HILTON HAINES
BY Darby & Darby
ATTORNEYS

United States Patent Office 2,838,598
Patented June 10, 1958

2,838,598

TELEVISION SYSTEM

Jesse Hilton Haines, Clifton, N. J., assignor to Allen B. Du Mont Laboratories, Inc., Clifton, N. J., a corporation of Delaware Application May 1, 1956, Serial No. 581,867

29 Claims. (Cl. 178—5.4)

This invention relates to the production of television signals, and more particularly to an improved technique for producing live television programs.

In the past, monochrome television signals have been produced by a technique which uses a flying spot scanner. In this method, a "flying" spot of light cyclically produces a series of lines known as a "field." At the end of each field, the spot of light "retraces," i. e. reverts back to its original position to form another field. The light produced by this moving spot is imaged by a lens system, strikes the subject to be televised, and is reflected to a pickup device comprised of phototubes (photocells which incorporate electron multipliers for increased output). These produce electrical signals whose amplitude varies with the amount of reflected light for that particular position of the light spot. Since any extraneous light not produced by the flying spot scanner would be picked up by the photocells and converted into spurious electrical signals, it is essential that the studio be in complete darkness—except for the feeble light produced by the flying spot scanner. This lack of studio illumination is very unsatisfactory since it restricts the actors' movements, prevents the reading of prepared scripts, and produces an adverse psychological effect caused by working in darkness.

It is, therefore, the principal object of this invention to provide an improved technique for producing either monochrome or color television signals.

It is another object to provide studio illumination without adversely affecting the television signals.

The attainment of these objects, and others, will be realized from a study of the following specification, taken in conjunction with the drawings, in which.

Figure 3:
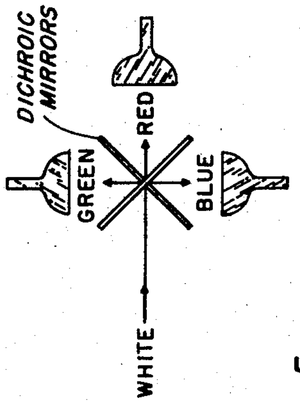
Figure 4:
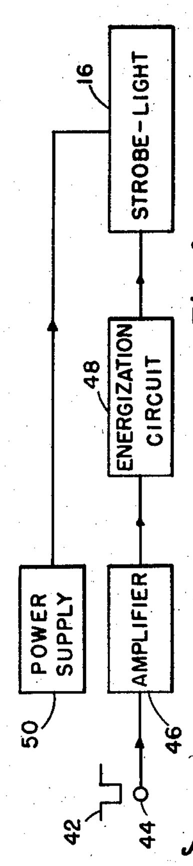
Figure 5:
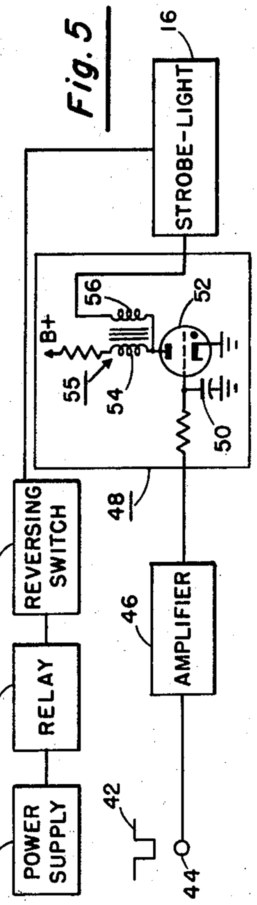

Fig. 3 describes an alternate pickup embodiment;

Fig. 4 illustrates in block diagram form, the circuitry for studio illumination;

Fig. 5 discloses circuitry for the energization circuit of Fig. 4; and

Figure 6:
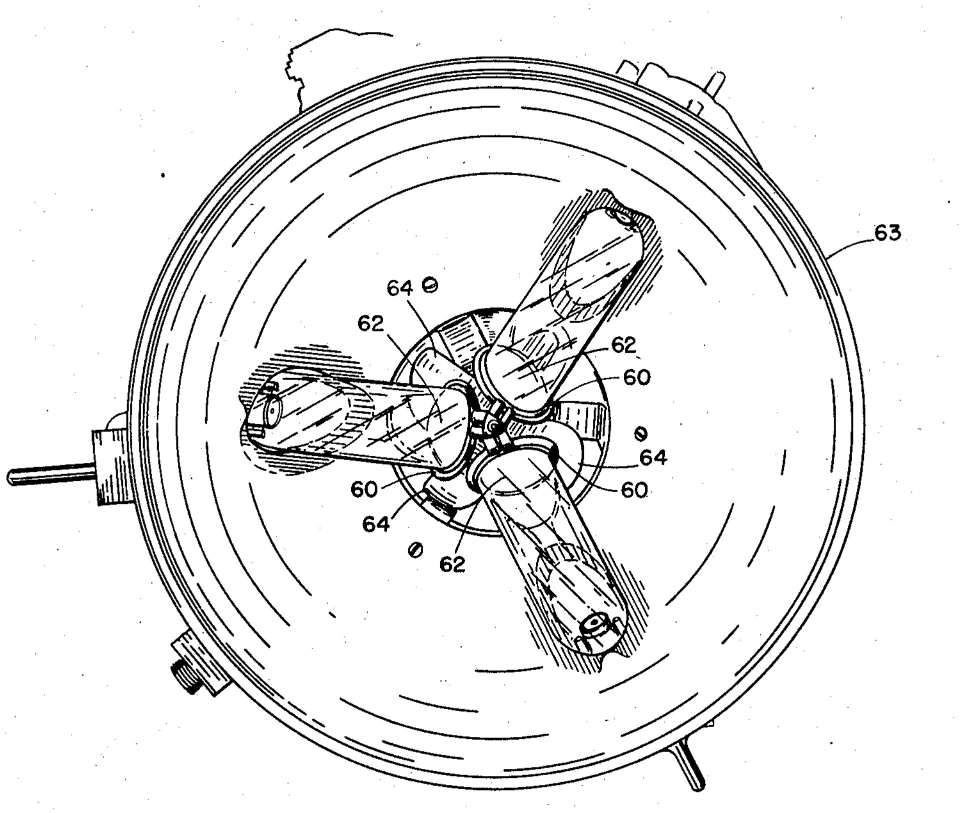

Fig. 6 shows one form of stroboscopic-light.

Figure 1:
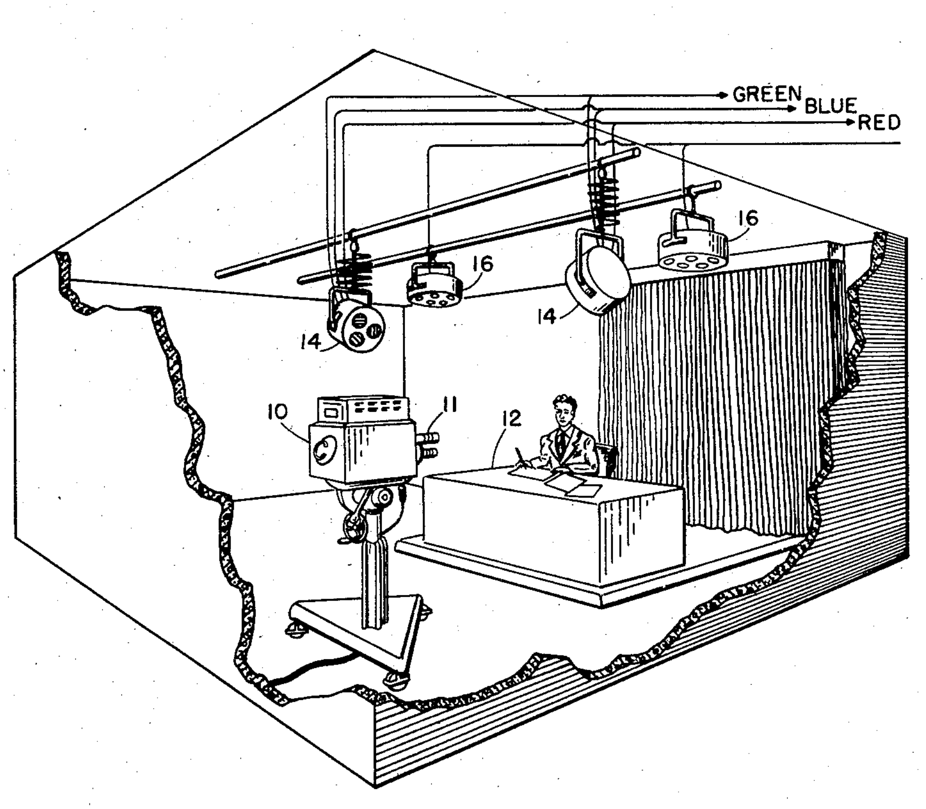
Fig. 1 illustrates a studio producing television signals through the use of the instant invention.

Referring now to Fig. 1, there is illustrated a mobile unit 10 which incorporates a cathode ray tube which operates as a flying spot scanner. By means known to those in the art, the spot of light traces a raster on the faceplate of the tube. After passing through suitable lenses 11, the light strikes the object 12 to be televised, and is reflected to a pickup device 14. The simplest pickup device for producing a monochrome television signal would consist of a single phototube. As explained in "The Vitascan, Live Flying-Spot Color Scanner"—Haines and Tingley, presented at the Mid-Winter Convention of A. I. E. E., February 2, 1956, a single phototube produces a picture that has a sharp shadow, as though a single spotlight has been used with a photographic camera. This shadow effect is corrected by the use of a plurality of phototubes—either spread out, clustered, or associated with reflectors.

In order to produce signals for color television the pickup device, known as a "scoop," contains a group of photocells which have filters placed over their faceplates so that specific photocells receive only a limited portion of the spectrum. In Fig. 1, four phototubes are shown in pickup device 14, a "blue" phototube having a filter which allows it to receive only blue light, a "green" phototube having a filter which allows it to receive only green light, and "red" phototubes having filters which allow them to receive only red light. It is known to those versed in the art that the phosphors used in a flying spot scanner produce very little red light, and that the pickup phototubes are rather insensitive to red light. To overcome this double deficiency, two "red" phototubes are used.

Whereas a single phototube produces black shadows, each of the "color" phototubes tends to produce a shadow in its own distinctive color. If this effect is apparent enough to be objectionable, it may be relieved by using a plurality of scoops, and/or reflectors whose advantages will hereinafter be discussed. As in monochrome the use of a plurality of scoops permits the attainment of more satisfactory and artistic effects.

The outputs of the red phototubes are combined for further processing, which will be hereinafter described. Similarly, the outputs of the blue phototubes are combined, and the same is done with the outputs of the green phototubes.

Figure 2:
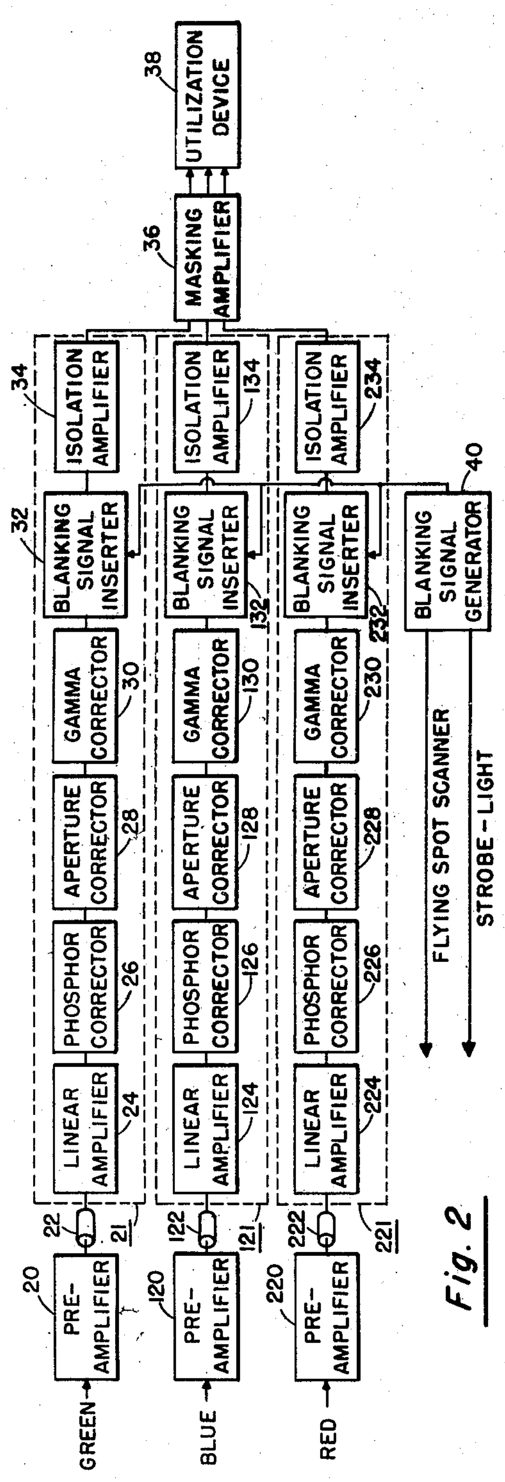
Fig. 2 is a block diagram of the circuitry involved.

Referring now to Fig. 2, there is shown in block diagram form appropriate circuitry for transforming the signals obtained from pickups 14 into signals suitable for application to a monitor or to a transmitter. Each color signal is similarly treated, and attention will therefore be directed to only one channel.

If the output of the phototube is small, it may be applied to a preamplifier 20 which is preferably mounted on the scoop. This permits appreciable amplification without introduction of noise or other spurious signals. In addition, the individual outputs can be selectively emphasized or reduced to obtain optimum artistic effects. From the preamplifier the signal undergoes a series of steps which generally include a number of amplifiers, although alternately they may be part of an overall processing amplifier 21. Since this unit is generally remote from the pickups, optimum results are obtained when shielded cable 22 is used between the pre-amplifier and the other amplifiers. The next step is further amplification of the color signal, this usually being performed by a linear amplifier 24.

It is known that the light emitted by the phosphors used in the flying spot scanner generally builds up quickly but decays relatively slowly. In order to overcome this trailing characteristic, the amplified signal may be processed by "phosphor-correctors" 26 which are normally identical for each channel, but may be slightly different. This amplifier is completely described in "Color film scanner circuits" by Joseph F. Fisher, published in the 1954 I. R. E. Convention Record—part 7, pages 95–6 and 98. It is also known that the light spot on the scanner is not the ideal infinitesimally small size, but has a definite size and shape. Depending on the desired resolution allowed by the size of the spot, the signal may be fed to an "aperture-corrector" 28 which shapes the signal to compensate for spot distortion. This unit is described in "Aperture compensation for television cameras" by Dennison, published on pages 569 et seq. of the December 1953 R. C. A. Review. Other circuitry may be used to emphasize the higher frequencies. The signal is then applied to a gamma corrector 30 whose function is to provide over all linearity to the system.

Many gamma corrector circuits are known, a particularly useful one being described in the above-mentioned "Color film scanner circuits" at pages 96, 97 and 99. Since the response of the phototube is linear, the gamma corrector merely compensates for the transfer characteristic of the viewing tube and its associated circuitry. The succeeding amplifier 32 is utilized to insert blanking signals in order to establish a reference level for black. If desired, an isolation amplifier 34 may be used after the blanking signal insertion.

The series of operations described for the green signal is substantially duplicated for the blue and for the red signals.

Ordinarily, the linearity of the photocells, and availability of a wide choice of color filters, provides properly balanced color signals having excellent color fidelities. However, since it may be difficult to obtain precisely the correct filters for obtaining the desired response curve, it may be advantageous to utilize a "masking amplifier" 36. This circuitry is fully described in a paper entitled "Electronic masking for color broadcasting," which appeared in the 1954 I. R. E. Convention Record, part No. 7, Broadcasting and Television. This amplifier permits precise adjustment of the separate output color signal by selectively modifying the input color signals. It thus over comes the described deficiencies, and provides three separate output signals which may be applied to utilization device 38. This may be a viewing monitor, or circuitry which prepares the signals for telecasting.

During the vertical retrace interval, the light spot is blanked out so that a vertical synchronizing pulse may be utilized. The signals which accomplish this blanking are obtained from a blanking signal generator 40 which may be separate or part of an overall system. These blanking signals are simultaneously applied to the flying spot scanner, to the blanking signal inserter in each channel, to any monitoring device which may be used, and to a stroboscopic-light which will be hereinafter described.

Fig. 1 indicates that the pickup phototubes face the object to be televised. When they are but a short distance from the subject, each phototube receives a small cone of light from a slightly different angle, and this may result in the objectionable color shadows previously discussed. This condition may be minimized by moving the pickup further from the subject; however, the increased distance also decreases the amount of light picked up, and thus reduces the output signal.

Another procedure which has been found to be advantageous is the use of a reflective paint or other material on the walls and ceiling of the studio. The minute multiple reflections from various points tend to increase the amplitude of the output signal, and effectively fill in the shadows.

A better solution is to use the phototubes in conjunction with a reflector which may be designed so that the phototubes face either in or out. This has the practical effect of increasing the size of the received cone of light. A second advantage of using a reflector is the inherent "mixing," so that each phototube sees the subject through the same large cone of light. This effect is analogous to placing a number of vari-colored light sources at the focus of a reflector, whereupon the final pencil of light will be white.

The embodiment of Fig. 3 illustrates the use of dichroic mirrors, whereby light strikes the mirror assembly and is selectively split to impinge upon various photocells. In this way, the light reaches each photocell at exactly the same angle relative to the object, and thus completely avoids color shadows.

As previously stated, if there is any extraneous light, a spurious signal will be produced by the phototubes. The studio is therefore only faintly illuminated, during horizontal scansions, by the dim light from the flying spot.

Fig. 1 shows stroboscopic-lights 16 which I pulse on during the vertical retrace interval by utilizing the vertical blanking signal. Thus, for the duration of the vertical retrace there is no television signal generated, and the stroboscopic-light is energized to illuminate the studio.

Various light sources may be used for the stroboscopic-light, the primary requirements being that they come on quickly at the start of the vertical blanking period, and that they die out completely at the end of said period. I have obtained satisfactory results with both cathode ray tubes having phosphors of suitable delay characteristics, and with various rare gas light sources known as flash tubes. Other satisfactory sources are presently available, the choice being made on the above grounds, power requirements, and cost.

Referring now to Fig. 4 there is illustrated in block diagram form a stroboscopic-light circuit which I have found satisfactory. An input signal 42 (obtained from blanking signal generator 40 of Fig. 2) is shown as a negative going pulse, but suitable circuitry known to those in the art will permit other types of input signals to be utilized.

The input signal is applied to input terminal 44, and to an amplifier 46 which may or may not be necessary, depending upon the phase and amplitude of input signal 42. The output of amplifier 46 is fed to an energization circuit 48 which controls the "on" period of the stroboscopic-light 16. The power for operation of the light source may be obtained from power supply 50.

Fig. 5 illustrates a circuit which may be used when the stroboscopic-light is a rare gas lamp. Energization circuit 48 may include a capacitor 50 which is discharged through a thyratron 52. The primary winding 54 of transformer 55 is thus energized, and secondary winding 56, which is of a suitable number of turns to produce a high voltage triggering signal, applies this signal to stroboscopic-light 16. Some manufacturers of light sources suggest that the polarity be reversed occasionally; this may be easily accomplished by use of a reverssing switch 58 connected between the stroboscopic-light and its power source. Some light sources show a tendency to continue operation after the end of the energization pulse. This situation may be corrected by a relay 60 (mechanical or electronic) which opens the circuit and thus forces the light source to extinguish, whereupon the relay closes to permit continued operation.

With rare gas lights, the tendency for the lamp to remain on after the time when it should be extinguished, and the possibility that the light will not go on at the precise moment that it should, tend to produce a flicker, which is considerably reduced by using a multiplicity of lights.

Fig. 6 illustrates a stroboscopic-light embodying the principles of a cathode ray tube, that may be used to overcome some of these difficulties. The phosphor must have a very low persistence (extinguish rapidly). The trigger pulse from energization circuit 48 is applied to the grid of the tube to produce instantaneous light which rapidly disappears. I have found, in particular, that if a metal faceplate 60 has its inner surface covered with a phosphor layer 62, and is mounted at an angle to the axis of the tube, a non-focused beam of electrons will flood the entire phosphor surface, which thereupon emits light through the glass walls of the tube. This construction permits an additional advantage in that several tubes may be mounted in a reflector 63 so that a fan 64 cools the outside surface of the metal faceplates. Either type of stroboscopic-light may be used, depending upon various other considerations.

Since the fields of the flying spot scanner occur at the rate of 60 per second, and the stroboscopic-light flashes during the vertical retrace intervals between fields, 60 pulses of light are produced every second. To the human eye the pulsed light appears to be continuous. If necessary, several lights may be used to provide higher illumination. Where desired, filters—or alternately phosphors of different color emitting characteristics—may be utilized to provide studio illumination of a more satisfactory color.

I have disclosed an improved television system incorporating studio illumination. Since other variations within the scope of my invention may occur to those in related arts, I desire to be limited not by the foregoing specification but rather by the claims granted to me.

What is claimed is:

1. A television system comprising: a studio having light reflecting walls; a flying spot scanner; a lens system focusing light from said scanner onto an object to be televised; pickup means comprising at least one phototube producing a blue signal, at least one phototube producing a green signal, at least two phototubes producing a red signal, and preamplifiers for each said signal; a processing amplifier for each color signal comprising a linear amplifier, a phosphor corrector amplifier, an aperture correcting amplifier, a gamma correcting amplifier, a blanking signal inserting amplifier, and an isolating amplifier; a blanking signal generator; means applying said blanking signal to said blanking signal inserting amplifiers; means applying said blanking signal to said scanner; a masking amplifier; means applying signals from each processing amplifier to said masking amplifier; a utilization device; means applying signals from said masking amplifier to said utilization device; a stroboscopic-light; a power source for said stroboscopic-light; means applying power from said power source to said stroboscopic-light; an energization circuit; means applying said blanking signal to said energization circuit; means applying the output of said energization circuit to said stroboscopic-light.

2. The apparatus of claim 1 wherein said pickup means includes a reflector.

3. The apparatus of claim 1 wherein said pickup means includes a dichroic mirror.

4. The device of claim 1 wherein said stroboscopic-light is a cathode ray tube whose metal faceplate is at an angle with the tube axis and is fan-cooled, and whose control grid is connected to receive the signal from said energizing circuit.

5. The apparatus of claim 1 wherein said stroboscopic-light comprises a rare gas flash light.

6. The device of claim 5 wherein said energizing circuit comprises a capacitor connected to discharge through a thyratron which energizes the primary winding of a transformer whose secondary winding provides a high voltage energizing signal.

7. A television system comprising: a studio having light reflecting walls; a flying spot scanner; a lens system focusing light from said scanner onto an object to be televised; pickup means comprising at least one phototube producing a blue signal, at least one phototube producing a green signal, and at least two phototubes producing a red signal; a processing amplifier for each color signal comprising a linear amplifier, a gamma correcting amplifier, and a blanking signal inserting amplifier; a blanking signal generator; means applying said blanking signal to said blanking signal inserting amplifiers; means applying said blanking signal to said scanner; a masking amplifier; means applying signals from each processing amplifier to said masking amplifier; a utilization device; means applying signals from said masking amplifier to said utilization device; a stroboscopic-light; a power source for said stroboscopic-light; means applying power from said power source to said stroboscopic-light; an energization circuit; means applying said blanking signal to said energization circuit; means applying the output of said energization circuit to said stroboscopic-light.

8. The apparatus of claim 7 wherein said pickup means includes a reflector.

9. The apparatus of claim 7 wherein said pickup means includes dichroic mirrors.

10. The device of claim 7 wherein said stroboscopic-light is a cathode ray tube whose metal faceplate is at an angle with the tube axis and is fan-cooled, and whose control grid is connected to receive the signal from said energizing circuit.

11. The apparatus of claim 7 wherein said stroboscopic-light comprises a rare gas flash light.

12. The device of claim 11 wherein said energizing circuit comprises a transformer whose primary winding is connected to discharge a thyratron therethrough, and whose secondary winding provides a high voltage energizing signal.

13. A television system comprising: a studio having light reflecting walls; a flying spot scanner; a lens system focusing light from said scanner onto an object to be televised; pickup means comprising at least one phototube producing a blue signal, at least one phototube producing a green signal, and at least two phototubes producing a red signal; a procesing amplifier for each color signal; a blanking signal generator; means applying said blanking signal to said processing amplifiers; means applying said blanking signal to said scanner; a masking amplifier; means applying signals from each processing amplifier to said masking amplifier; a utilization device; means applying signals from said masking amplifier to said utilization device; a stroboscopic-light; a power source for said stroboscopic-light; means applying power from said power source to said stroboscopic-light; an energization circuit; means applying said blanking signal to said energization circuit; means applying the output of said energization circuit to said stroboscopic-light.

14. The apparatus of claim 13 wherein said pickup means includes a reflector.

15. The apparatus of claim 13 wherein said pickup means includes a dichroic mirror.

16. The device of claim 13 wherein said stroboscopic-light is a cathode ray tube whose metal faceplate is at an angle with the tube axis and is fan-cooled, and whose control grid is connected to receive the signal from said energizing circuit.

17. The apparatus of claim 13 wherein said stroboscopic-light comprises a rare gas flash light.

18. The device of claim 17 wherein said energizing circuit comprises a transformer whose primary winding is connected to discharge a thyratron therethrough, and whose secondary winding provides a high voltage energizing signal.

19. A television system comprising: a studio having light reflecting walls; a flying spot scanner; a lens system focusing light from said scanner onto an object to be televised; pickup means producing television type signals; a processing amplifier for said television type signals; a blanking signal generator; means applying said blanking signal to said processing amplifier; means applying said blanking signal to said scanner; a utilization device; means applying signals from said processing amplifiers to said utilization device; a stroboscopic-light; a power source for said stroboscopic-light; means applying power from said power source to said stroboscopic-light; an energization circuit; means applying said blanking signal to said energization circuit; means applying the output of said energization circuit to said stroboscopic-light.

20. The apparatus of claim 19 wherein said pickup means includes a reflector.

21. The apparatus of claim 19 wherein said pickup means includes dichroic mirrors.

22. The device of claim 19 wherein said stroboscopic-light is a cathode ray tube whose metal faceplate is at an angle with the tube axis and is fan-cooled, and whose control grid is connected to receive the signal from said energizing circuit.

23. The apparatus of claim 19 wherein said stroboscopic-light comprises a rare gas flash light.

24. The device of claim 23 wherein said energizing circuit comprises a transformer whose primary winding is connected to discharge a thyratron therethrough, and whose secondary winding provides a high voltage energizing signal.

25. A television system comprising: a studio having light reflecting walls; a flying spot scanner; a lens system focusing light from said scanner onto an object to be televised; pickup means comprising at least one phototube producing a blue signal, at least one phototube producing a green signal, and at least two phototubes producing a red signal; a processing amplifier for each color signal comprising a linear amplifier, a phosphor corrector amplifier, an aperture correcting amplifier, a gamma correcting amplifier, a blanking signal inserting amplifier, and an isolating amplifier; a blanking signal generator; means applying said blanking signal to said blanking signal inserting amplifiers; means applying said blanking signal to said scanner; a masking amplifier; means applying signals from each processing amplifier to said masking amplifier; a utilization device; means applying signals from said masking amplifier to said utilization device.

26. A device for illuminating a studio which is producing television type signals by the use of the flying spot scanner technique, comprising: a stroboscopic-light; a power source for said stroboscopic-light; means applying power from said power source to said stroboscopic-light; an energization circuit; means applying a signal from said scanner to said energization circuit during the interval said scanner is blanked out; means applying the output of said energization circuit to said stroboscopic-light whereby said stroboscopic-light emits general illumination for the studio and persons therein without causing said television type signals to contain spurious components.

27. The device of claim 26 wherein said stroboscopic-light is a cathode ray tube whose metal faceplate is at an angle with the tube axis and is fan-cooled, and whose control grid is connected to receive the signal from said energizing circuit.

28. The apparatus of claim 26 wherein said stroboscopic-light comprises a rare gas flash light.

29. The device of claim 28 wherein said energizing circuit comprises a transformer whose primary winding is connected to discharge a thyratron therethrough, and whose secondary winding provides a high voltage energizing signal.

References Cited in the file of this patent

UNITED STATES PATENTS

| | | |
|---|---|---|
| 2,007,651 | Ives | July 9, 1935 |
| 2,191,515 | Von Bronk | Feb. 27, 1940 |
| 2,343,971 | Goldsmith | Apr. 14, 1944 |